H. L. HARRISON.
Feather-Duster.
No. 165,574. Patented July 13, 1875.
FIG. I
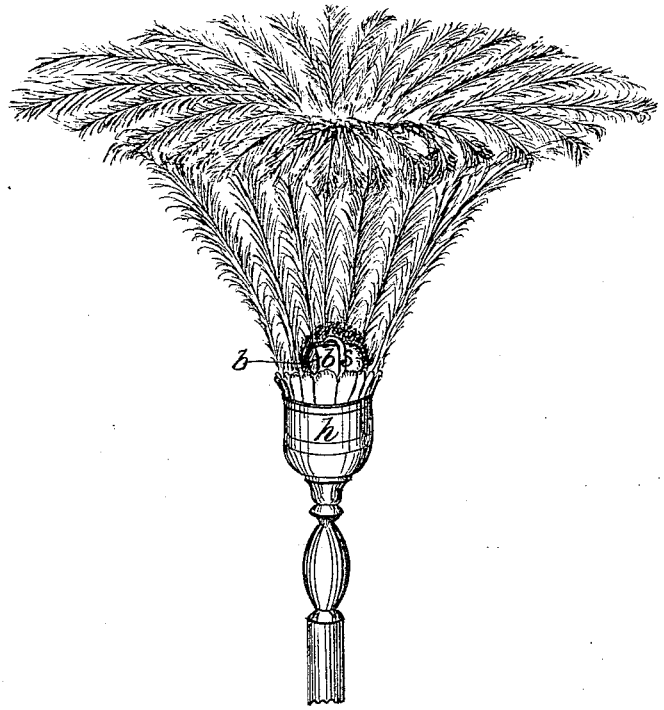
FIG. II
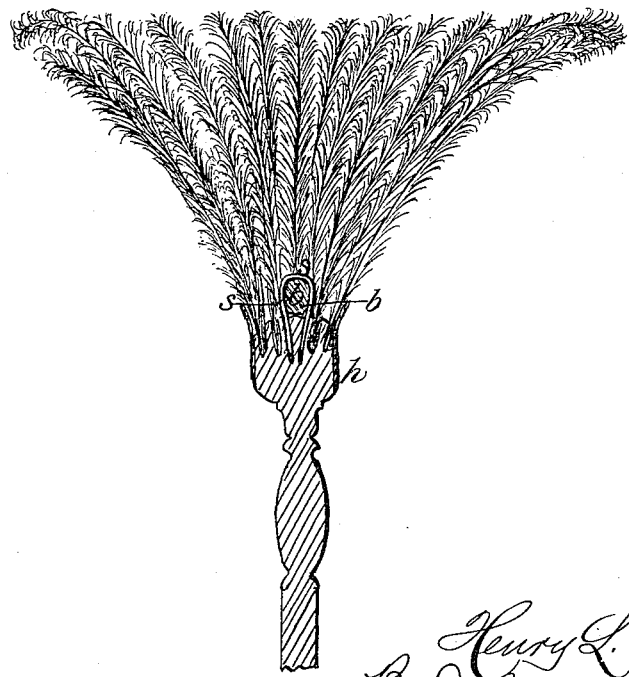

UNITED STATES PATENT OFFICE.

HENRY L. HARRISON, OF EAST SAGINAW, MICHIGAN.

IMPROVEMENT IN FEATHER DUSTERS.

Specification forming part of Letters Patent No. 165,574, dated July 13, 1875; application filed June 5, 1875.

*To all whom it may concern:*

Be it known that I, HENRY L. HARRISON, of East Saginaw, in the county of Saginaw and State of Michigan, have invented certain new and useful Improvements in Feather-Dusters; and I do hereby declare that the following is a full, clear, and exact description thereof, which will enable others skilled in the art to which it pertains to make and use the same, reference being had to the accompanying drawing and to the letters of reference marked thereon, which form a part of this specification.

It has often been a matter of wonder to housekeepers where the moths came from, or how they were generated in furniture which has been kept scrupulously clean. This question is easily answered by an examination of the ordinary furniture-dusters, which often contain moths in great quantities, and scatter them broadcast upon everything touched by them. This fact was brought to my knowledge by opening several packages of valuable dusters which I discovered to be almost alive with moths. Where they came from, or how they got in, I knew not, and could only surmise that it was through the negligence of some one in packing them or handling them. Had these been sold into many families, they would have done an incalculable amount of mischief. Besides this, the collection of dirt and dust in dusters forms a natural nest for moths and other vermin. My object, therefore, in introducing the Tonka or moth bean into a furniture-duster is to provide a repellent to moths and thereby destroy them in the first instance, since they cannot exist within reach of the aroma of this bean.

The accompanying drawings represent a feather-duster, showing the brush portion in section, to illustrate my invention.

I usually attach the bean $b$ to the end of the handle $h$, by means of a staple, $s$, at or near the junction of the bunched feathers. This appliance will last as long as the duster, —is inexpensive, easily applied, and practicable. It will be a benefit and prevent much damage to household goods. The Tonka or moth bean diffuses an odor throughout all the brush portion of the duster which is repugnant to moths, so that not only at the neighborhood of the bean is the duster mothproof, but throughout its every part. By means of this moth-proof duster one source at least of moth generation is avoided. The bean may be applied and held by any suitable mechanical device, and may be concealed or secured in any part of the brush and need not be visible. It may be applied during the manufacture of the brush or afterward. It may be secured in a sack or box fixed on the end of the handle so as to be concealed.

I claim the following as my invention:

1. A feather-duster charged with a fixed moth-protector, substantially as and for the purpose specified.

2. A moth-proof feather-duster consisting of the head, brush, and the contained Tonka or moth bean, substantially as herein set forth.

In testimony that I claim the foregoing as my own, I have affixed my signature in presence of two witnesses.

HENRY LYMAN HARRISON.

Witnesses:
 CHESTER B. JONES,
 REUBEN HARRISON.